Patented July 2, 1940

2,206,851

UNITED STATES PATENT OFFICE 2,206,851

PROCESS FOR TREATING SEWAGE

Clyde Potts, Morristown, and Chester G. Wigley, Margate City, N. J.; said Wigley assignor to said Potts No Drawing. Application November 23, 1936, Serial No. 112,294

5 Claims. (Cl. 210—2)

The present invention relates to a process for economically and expeditiously converting the solid organic matter found in sewage, into a stable product of high value as a fertilizer and soil filler.

As we pointed out in an earlier patent, No. 1,730,489, granted to us October 8, 1929, the ordinary treatment of sewage from cities, towns, public and private institutions and other sources, requires months of time, a great deal of labor and an elaborate, expensive plant, occupying several acres of ground. Aside from the time, plant expense, etc., involved in the old treatment, the resulting product retains all of the objectionable characteristics of raw sewage, which become offensively prominent when the product is moistened. Lacking stabilization, the product has very low fertilizer value, as the market for it is limited to farms, truck gardens and the like open spaces, far removed from settled sections.

Our earlier patent referred to, disclosed an improved process for treating sewage solids, which consists in separating the solids from the flowing stream by sedimentation, then subjecting a bed of such separated solids to natural or gravital drainage, in a chamber, specially constructed to substantially exclude sunlight and fresh air and in which, a suitable temperature is maintained. Under the conditions stated, a growth of fungi develops, which permeates the mass and transforms the foul consistency thereof into plant life, leaving the original matter as a dry, flaky or granular stabilized materials.

In practice, the above process, while effective for completely stabilizing sewage solids, is open to objection in the time and labor required, plant acreage occupied and the number and expense of specially constructed chambers needed to handle the material.

With a view to avoiding these objections and improving the process, we have found by extended experiment, that the time required for carrying out the process may be greatly shortened and the development of plant life hastened and made more abundant by subjecting the sewage solids to a preliminary conditioning process, which renders them more amenable to the action of the fungi and molds.

As the first step in the preliminary processing of fresh sewage, it is found of advantage, before the solids are separated from the liquid, to pass the sewage through a comminutor or other mechanical device, to macerate or break up the solids to reduce them to a more or less finely divided state. This reduction of the solids results in facilitating subsequent separation from the liquid and also in expediting the decomposing action of the fungi and molds therein.

In sewage that has aged to the point where disintegration has set in sufficiently to break up the solids, separation of the solids from the liquid may be accomplished effectively and plant life will develop therein expeditiously, without the aid of mechanical maceration or other machine action but, ordinarily, the condition is such, that the preliminary machining is found of advantage.

Following separation of the solids from the liquid, which may be effected by sedimentation, machine action or other appropriate method, the next step in the preliminary processing of the solids, is to make such adjustment of the pH of the solids or sludge as may be required for the best growth of the fungi. The most satisfactory results are obtained when the pH of the sludge is under 7, but more or less variation above or below is allowable, without serious effect. In many locations, the pH of the sludge will be found within the allowable range, making this adjustment step unnecessary, while in other locations, the employment of chemicals such as lime, ferric chloride or the like, may be required to adjust the pH of the sludge, to condition it for full responsive action under the treatment to which it is subsequently subjected, in carrying out the process.

De-watering of the solids now follows and it may be effected expeditiously by means of a vacuum filter, centrifuge or like apparatus or, by mixing with the raw solids, an absorbent material,—preferably, the dried, stabilized residue or finished product of the process, the proportions in the mixture depending upon the water content of the solids under treatment. Ordinarily, the water content is reduced by the machine or absorption method described, to 60 or 70 percent or sufficiently for the best propagation of the fungi or molds. It may vary more or less, depending upon the nature and condition of the sewage but, under ordinary circumstances, the fungi or molds will develop at a high rate, with the content as stated.

In de-watering by the absorption method, there are important advantages gained in mixing in the dried residue or finished product of the process, as it contains countless numbers of seeds, spores or mycelia and while it is not necessary to provide these in the raw solids, as they are naturally present there, such addition insures a more abundant plant growth. This addition of the residue or dried stabilized product, may be made through any one of a number of mixing machines now available in the market.

The final step in the preliminary conditioning process, is to shred the solids by means of a suitable mechanical shredder or macerator, in order to obtain best results, under certain conditions and with certain sewages but it is not always necessary, being more or less optional.

After this preliminary processing, the solids are subjected to conditions most favorable to rapid propagation of fungi therein. That is to say—(a) direct sunlight and other harmful rays of light are excluded; (b) protection is provided against harmful air currents; (c) a moderate temperature is maintained; and (d) loss of moisture is prevented.

The above conditions may be produced artificially or naturally. To produce the conditions artificially, a special chamber is required in which light, air, heat and moisture can be controlled. The same conditions can be produced naturally by piling the solids up in the open air and letting them stand until an outer crust forms, which excludes light and air, develops the necessary heat within the mass and holds the moisture against evaporation.

The artificially produced conditions give quicker and better results and are preferred, as the capacity of the housing chamber is determined by the time required for the fungi to develop sufficiently to stabilize the solids, and the more this time is shortened, the greater will be the capacity of the chamber, which means a reduction in the number and expense of building additional chambers to handle a given amount of material.

Having described our invention, we claim:

1. In the process of stabilizing sewage solids by the action of molds and fungi, the step of further de-watering the solids, after they have been separated from the liquid, by first mixing therewith a quantity of dry pulverant material of their own composition to immediately absorb the bulk of the liquid and then subjecting the solids to conditions of light, heat and moisture favorable to the rapid growth of fungi therein and the development of permeating mycelia throughout the mass to absorb the remaining liquid and reduce the mass to a substantially dry, pulverant, non-malodorous condition suitable for use as a fertilizer.

2. The process of speeding development of plant life in sewage solids for the stabilization of such solids, after they have been separated from the liquid, which consists first, in reducing the solids to a finely divided state to free and thereby speed germination of the plant seed or spores contained therein; second, in mixing with the solids a suitable quantity of dry material of their own composition to act as an absorbent for the immediate reduction of the liquid content of the mass; and third, in subjecting the mass to conditions of warmth, dampness, stagnant atmosphere and relative absence of light, until the mass is reduced to a substantially dry, pulverant, non-malodorous condition.

3. The process of speeding development of plant life in sewage solids for the stabilization of such solids, which consists first, in separating the solids from the liquid; second, in breaking up the solids to free and thereby speed germination of the plant seed or spores contained therein; third, in mixing with the mass a suitable quantity of the dry finished product of the process to reduce the liquid content thereof by absorption; and fourth, in subjecting the mass to conditions of warmth, dampness, stagnant atmosphere and relative to absence of light, until the mass is reduced to a substantially dry, pulverant, non-malodorous condition.

4. The process of stabilization of sewage solids, as defined in claim 3, in which the pH of the solids is adjusted to the optimum of fungi growth.

5. The process of stabilization of sewage solids, as defined in claim 3, in which the solids after being de-watered are shredded to reduce mass formation.

CLYDE POTTS.
CHESTER G. WIGLEY.